(12) United States Patent
Lundin

(10) Patent No.: US 6,863,428 B2
(45) Date of Patent: *Mar. 8, 2005

(54) LIGHT GUIDE ILLUMINATION DEVICE APPEARING UNIFORM IN BRIGHTNESS ALONG ITS LENGTH

(75) Inventor: David J. Lundin, Woodbury, MN (US)

(73) Assignee: 3M Innovative Properties Company, Saint Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 80 days.

(21) Appl. No.: 09/479,795

(22) Filed: Jan. 10, 2000

(65) Prior Publication Data
US 2002/0030999 A1 Mar. 14, 2002

Related U.S. Application Data

(63) Continuation-in-part of application No. 08/957,573, filed on Oct. 24, 1997, now Pat. No. 6,123,442.

(51) Int. Cl.$^7$ .............................. G02B 5/02; G02B 6/16
(52) U.S. Cl. ...................... 362/558; 362/551; 385/123; 385/901
(58) Field of Search .................. 362/31, 551, 558, 362/560; 385/31, 123, 146, 901; 349/64, 65

(56) References Cited

U.S. PATENT DOCUMENTS 3,497,981 A 3/1970 Tyne
4,422,719 A 12/1983 Orcutt ........................ 350/90.3
4,539,251 A 9/1985 Sugisawa et al. ............ 428/216
4,615,579 A * 10/1986 Whitehead ................... 385/133

(List continued on next page.)

FOREIGN PATENT DOCUMENTS

DE 41 31 340 C1 9/1991
DE 4407498 * 9/1995
EP 0 590 511 A1 4/1994

(List continued on next page.)

OTHER PUBLICATIONS

Abstract of Japanese Patent Application No. 7–198848 dated Aug. 1, 1995.*

(List continued on next page.)

*Primary Examiner*—Alan Cariaso
(74) *Attorney, Agent, or Firm*—Stephen W. Buckingham

(57) ABSTRACT

An illumination device that is relatively bright and uniform in appearance includes a light guide, which has a light guide core having an optically smooth surface for propagating light therethrough. A light emitting region, which extends along a portion of the core, includes at least one light extraction structure located along the optically smooth surface of the light guide core. The light extraction structure, which includes an optically reflective surface extending into the light guide core, is oriented to reflect light at an angle less than a critical angle necessary for light to propagate through the light guide core. A diffuse reflective material is disposed around at least a portion of the light guide. The diffuse reflective material directs at least a portion of the light reflected by the light extraction structure back through the light guide so that light is emitted through the light emitting region of the optically smooth surface.

31 Claims, 2 Drawing Sheets

U.S. PATENT DOCUMENTS

| | | | |
|---|---|---|---|
| 4,726,989 A | | 2/1988 | Mroziaski ................ 428/315.5 |
| 4,733,332 A | | 3/1988 | Yamashita et al. ............ 362/32 |
| 4,867,881 A | | 9/1989 | Kinzer ....................... 210/490 |
| 5,027,259 A | | 6/1991 | Chujko ........................ 362/32 |
| 5,363,470 A | * | 11/1994 | Wortman ................ 385/133 X |
| 5,416,608 A | | 5/1995 | Ueda et al. ................. 358/474 |
| 5,420,761 A | * | 5/1995 | DuNah et al. ................. 362/31 |
| 5,432,876 A | | 7/1995 | Appeldorn et al. ........... 385/31 |
| 5,537,297 A | | 7/1996 | Ghandehari .................. 362/32 |
| 5,542,017 A | | 7/1996 | Koike ........................ 385/123 |
| 5,631,994 A | | 5/1997 | Appeldorn et al. ......... 385/147 |
| 5,706,065 A | * | 1/1998 | Yano .......................... 349/112 |
| 5,710,856 A | * | 1/1998 | Ishii et al. .................... 362/31 |
| 5,744,534 A | | 4/1998 | Ishiharada et al. .......... 524/442 |
| 5,744,543 A | * | 4/1998 | Ishiharada et al. .......... 524/442 |
| 5,799,124 A | | 8/1998 | Zorn et al. .................. 385/125 |
| 5,982,969 A | * | 11/1999 | Sugiyama et al. ...... 385/901 X |
| 5,999,685 A | * | 12/1999 | Goto et al. .................... 362/31 |

FOREIGN PATENT DOCUMENTS

| | | | |
|---|---|---|---|
| EP | 0594089 | | 4/1994 |
| EP | 0534140 | | 3/2000 |
| FR | 2591717 | | 8/1986 |
| FR | 2597717 | | 10/1987 |
| JP | 58-007603 | | 1/1983 |
| JP | 1105206 | * | 4/1989 |
| JP | 1-187505 | | 7/1989 |
| JP | 7-19847 | | 8/1995 |
| JP | 1105206 A | | 8/1995 |
| JP | 7-198951 | | 8/1995 |
| JP | 7-198953 | | 8/1995 |
| JP | 8-15527 | | 1/1996 |
| JP | 8146226 | * | 6/1996 |
| WO | WO 95/16877 | | 6/1995 |
| WO | WO 97/08571 | | 3/1997 |
| WO | WO 97/38263 | | 10/1997 |
| WO | WO 98/20279 | | 5/1998 |
| WO | WO0050808 | | 8/2000 |

OTHER PUBLICATIONS

Abstract of Japanese Patent Application No. 8–313708 dated Nov. 29, 1996.*

Abstract of Japanese Patent Application No. 8–329716.*

* cited by examiner

LIGHT GUIDE ILLUMINATION DEVICE APPEARING UNIFORM IN BRIGHTNESS ALONG ITS LENGTH

RELATED APPLICATIONS

This application is a continuation-in-part of U.S. appl. Ser. No. 08/957,573 entitled "Articles With Diffuse Reflection of Light From Light Fibers," filed in the U.S. Patent Trademark Office on Oct. 24, 1997 now U.S. Pat. No. 6,123,442.

FIELD OF THE INVENTION

The present invention relates generally to an illumination device, and more particularly, to a light guide illumination device having optical quality light extraction structures and a diffuse reflective material to provide a light guide that appears substantially uniform in brightness along its length.

BACKGROUND OF THE INVENTION

Optically transmissive materials, such as glass or polymers may be used as a light guide to propagate light. A light guide typically includes at least one surface adapted to receive light from a light source and an optically smooth surface for reflecting light propagating through the light guide. Common examples of light guides include optical fibers traditionally used in the data communication industry and more recently light fibers used for illumination purposes. For example, U.S. Pat. No. 5,432,876 (the '876 patent) discloses one such illumination device employing light fibers. In this device, light may be injected into at least one end of a light fiber and allowed to exit the fiber at a predetermined position or positions along the length of the fiber. Light extraction structures or notches are formed in the core of the light fiber. The extraction structures define first and second reflecting surfaces, which reflect in a radial direction a portion of the light propagating axially through the fiber. The reflected light is directed at an angle that is less than the critical angle necessary for continued propagation along the fiber according to the principle of total internal reflection. As a result, the reflected light is extracted from the fiber. In contrast to prior techniques such as subjecting the fiber to relatively sharp bends, this system extracts light from the fiber in a controlled fashion.

Because the previously mentioned light extraction structures are formed from optically smooth surfaces, they reflect light by total internal reflection rather than by diffuse reflection. As a result, light is emitted from the light fiber in a pattern dictated by the configuration and arrangement of the extraction structures along the fiber. In general, when viewed at relatively close proximity, light from individual light extraction structures appears as discrete lines of light. That is, the light fiber generally will not appear to produce even illumination along its length, as does, for example, a fluorescent light. For example, when the extraction structures are sufficiently far apart from one another, the illumination pattern generated along the fiber is a series of bright stripes or lines of light alternating with regions of reduced intensity. In other cases, notably in planar light guides used to provide flat panel illumination, an image of the light source is transferred down the light guide so that the resulting illumination pattern includes an image of the light source, thus creating a nonuniform brightness level across the surface of the light guide.

A light fiber that appears uniform in brightness along its length is desirable for many applications. For example, such a light fiber could be used in place of neon lighting, which is often employed to form self-illuminated characters or letters or to outline the profile of a portion of a building.

U.S. Appl. Ser. No. 08/957,573 discloses a light fiber illumination device that employs roughened or uneven areas on the interior of the cladding, which serve as light extraction structures. The roughened areas comprise randomly dimensioned protrusions or pits that extract light in a diffuse manner. Because the extracted light is diffuse, it appears more uniform in brightness along the length of the fiber than the light extracted by extraction structures formed from optically smooth surfaces.

Unfortunately, because the roughened areas are not of optical quality but are rather random in size and orientation, it is difficult to control the amount of light radially extracted from the fiber and thus in general it is difficult to achieve high levels of brightness by this extraction technique. Thus, while such roughened areas facilitate the diffusion of light, they are less efficient at extracting the light than light extraction structures formed from optical quality surfaces.

To overcome the problem of reduced brightness, the previously mentioned patent application employs a diffuse reflective sheet of material that is disposed around a portion of the light fiber. The diffuse reflective sheet is used to reflect light back through the fiber at angles such that most of the reflected light passes through the fiber. Light that would otherwise be extracted and transmitted away from a viewer can then be observed, adding brightness to light extracted from an observable portion of the fiber. In essence then, this light fiber illumination device uses the diffuse reflective sheet primarily to increase the apparent amount of light that is extracted, while the roughened portions of the cladding are used to extract as well as diffuse the emitted light However, since they are more efficient at extracting light, it would be advantageous to use optical quality light extraction structures rather than roughened portions of the cladding to extract light from the fiber. Unfortunately, a device using such an extraction technique typically appears to have discrete, non-uniform areas of brightness along its length.

The present invention is therefore directed to the problem of providing an illumination device that extracts light in a relatively efficient manner to enhance its brightness while producing even or uniform illumination along its length.

SUMMARY OF THE INVENTION

The present invention solves this problem by employing optical quality extraction structures for performing light extraction and a diffuse reflective layer for diffusely reflecting the extracted light. Thus, the most efficient element is employed for extracting light while the most appropriate element, a diffuse reflective layer, is reserved for diffusely reflecting light.

The present invention provides an illumination device that includes a light guide including a light guide core having an optically smooth surface for propagating light therethrough. A light emitting region, which extends along a portion of the core, includes at least one light extraction structure located along the optically smooth surface of the light guide core. The light extraction structure, which includes an optically reflective surface extending into the light guide core, is oriented to reflect light at an angle less than a critical angle necessary for light to propagate through the light guide core. A diffuse reflective sheet material is disposed around at least a portion of the light guide. The diffuse reflective material directs at least a portion of the light reflected by the light extraction structure back through the light guide so that the light is emitted through the light emitting region of the optically smooth surface.

In accordance with one aspect of the invention, the light guide may be a light fiber. Additionally, the light guide may have a circular or noncircular cross-sectional shape, and may even be a planar waveguide.

In accordance with yet another aspect of the invention, the diffuse reflective sheet material is a polymeric sheet material. Alternatively, the diffuse reflective sheet material may be microvoided sheet material, a microporous material such as polytetrafluoroethylene, or a material formed by thermally induced phase separation.

In accordance with another aspect, the illumination device includes a plurality of light extraction structures, The extraction structures may be equally spaced apart from one another along the optically smooth surface. Alternatively, the plurality of light extraction structures may be unequally spaced apart from one another along the optically smooth surface.

In one particularly advantageous embodiment, the light guide is formed from a polymerizable material such as an acrylate or urethane material.

DETAILED DESCRIPTION

Light Guide Illumination Device

Figure 1:
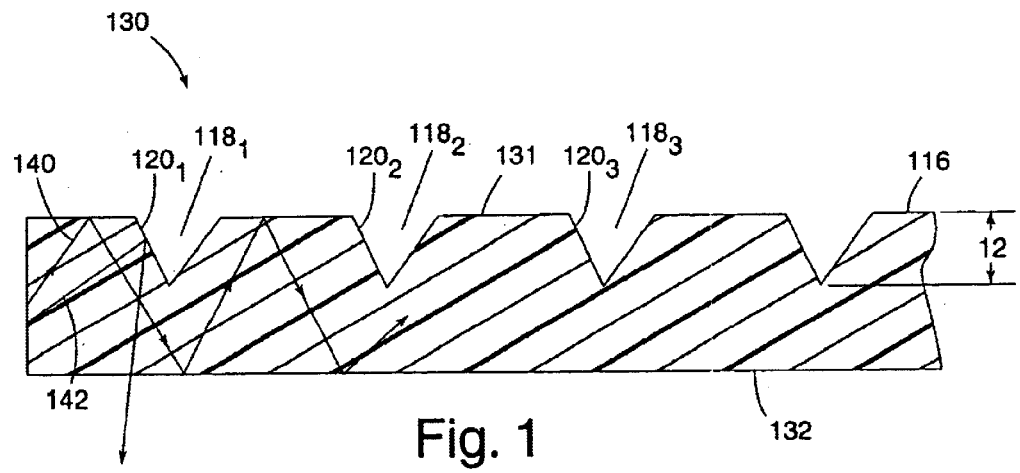
FIG. 1 is a schematic, cross-sectional view of a known illumination device illustrating the operation of the light extraction structures.

FIG. 1 depicts a side view of a portion of a known illumination device. The illumination device is formed from a light guide 130 having a light guide core and a cladding surrounding the core. The refractive index of the core is greater than the refractive index of the cladding so that the light traveling through or along or down the light guide is reflected at the surfaces of the light guide with minimal losses in accordance with the principles of total internal reflection. In the simplest case, the cladding may be ambient air, thus avoiding the need for a separate cladding material. The illumination device shown in FIG. 1 does not employ a cladding material.

Light guide 130 has a circumferential surface 116 that includes one or more light extraction structures $118_1$, $118_2$, $118_3$, . . . that are formed therein. Circumferential surface 116 includes a first surface portion 131, which contain light extraction structures $181_1$, $118_2$, $118_3$, . . . , and a second surface portion 132 located diametrically opposite first surface portion 131. Each extraction structure includes at least one optically smooth surface $120_1$, $120_2$, $120_3$, . . . . In operation, light ray 140 strikes a portion of circumferential surface 116 not occupied by a light extraction structure 118, where it is reflected back into the light guide at an angle greater than the critical angle of the light guide, and accordingly, continues to propagate along the light guide. By contrast, light ray 142 strikes an optically smooth surface 120, of light extraction structure $118_1$, which reflects light ray 142 into light guide 130 at an angle which is less than the critical angle necessary for continued propagation along light guide 130. Light ray 142 is thereby transmitted through the second surface portion 132 of circumferential surface 116. As previously mentioned, while the illumination device depicted in FIG. 1 is relatively efficient at extracting light, the light is not diffuse and thus may not appear uniform along the length of the fiber.

Figure 2:
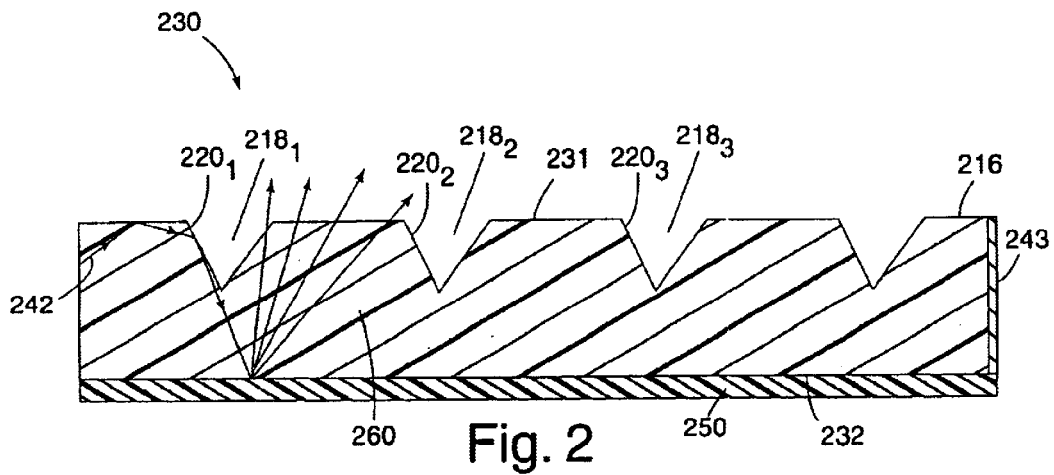
FIG. 2 is a schematic, cross-sectional view of an illumination device constructed in accordance with the present invention.

FIG. 2 shows an embodiment of an illumination device 230 constructed in accordance with the present invention. The device is similar to the illumination device shown in FIG. 1 except that a diff-use reflective layer 250 is provided along second surface portion 232. In other words, diff-use reflective layer 250 is positioned to interrupt the path of light ray 42 shown in FIG. 1. As a result, rather than being emitted from the light guide, light ray 42 is now diffusely reflected back into light guide core 260. As shown in FIG. 2, light ray 242 now strikes the first surface portion 231 of circumferential surface 216 at an angle less than the critical angle necessary for continued propagation along light guide 230 and thus the light is transmitted through first surface portion 231. Accordingly, in contrast to the known illumination light guide depicted in FIG. 1, light is now emitted from the inventive illumination device through the portion 231 of circumferential surface 216 in which light extraction structures $218_1$, $218_2$, $218_3$, . . . are located.

One important advantage of the present invention is that light is extracted from the light guide in a controlled and efficient manner, yet the light guide appears uniform in brightness without inhomogeneities caused, for example, by the spacing of the extraction structures.

Figure 3:
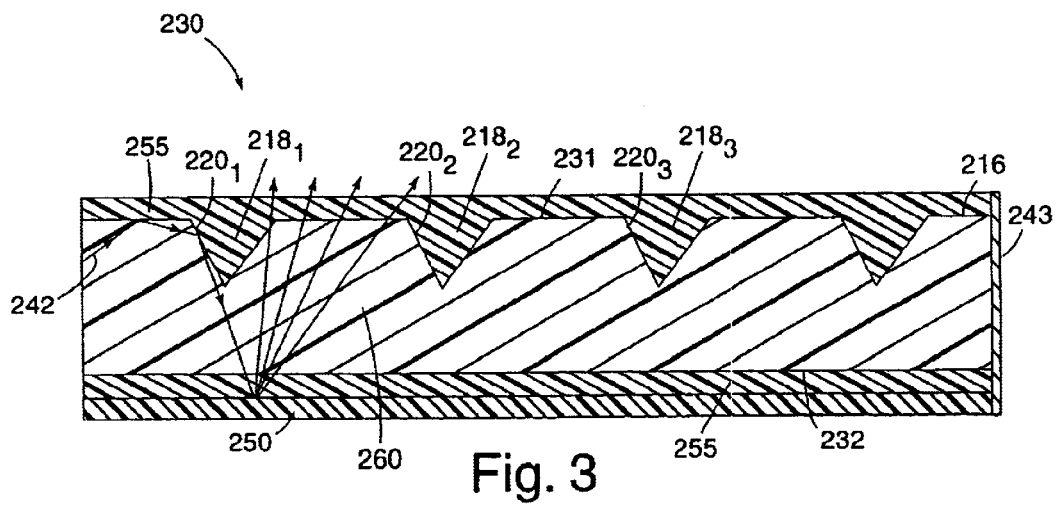
FIG. 3 is a schematic, cross-sectional view of an alternative embodiment of the invention that employs a cladding material.

Diffuse reflective layer 250 may be in direct contact with the core of light guide 230. As a result of the direct contact, however, some light may be extracted by reflective layer 250. Alternatively, to prevent light extraction by diffuse reflective layer 250, in preferred embodiments of the invention such as shown in FIG. 3, a cladding 255 may be interposed between the core and diffuse reflective layer 250. In FIGS. 2 and 3 like elements are denoted by like reference numerals.

Diffuse reflective layer 250 may be formed from microvoided particle-filled sheets that are diffusely reflective due to differences in refractive index of the particles, the surrounding matrix, and air-filled voids created or enlarged by, for example, stretching. In addition, microporous materials made from, for example, sintered polytetrafluoroethylene (PTFE), made in sheet form, can also act as diffuse reflective material. Another particularly suitable diffuse reflective sheet material comprises a microporous polyolefin material often referred to as a TIPS (thermally induced phase separation) sheet material. Examples of such materials are described in U.S. Pat. Nos. 4,539,251, 4,726,989, and 4,867,881. TIPS sheet material typically includes a thermoplastic polymeric structure having a plurality of cells with adjacent cells being interconnected by passageways to provide a network of communicating pores. This sheet material is oriented in at least one direction. The thermoplastic polymeric structure may be substantially homogeneous or the porosity of the structure may exhibit a gradient therethrough. The cells typically include void spaces encased by fibrous, lacy, or semi-continuous boundaries.

Figure 4:
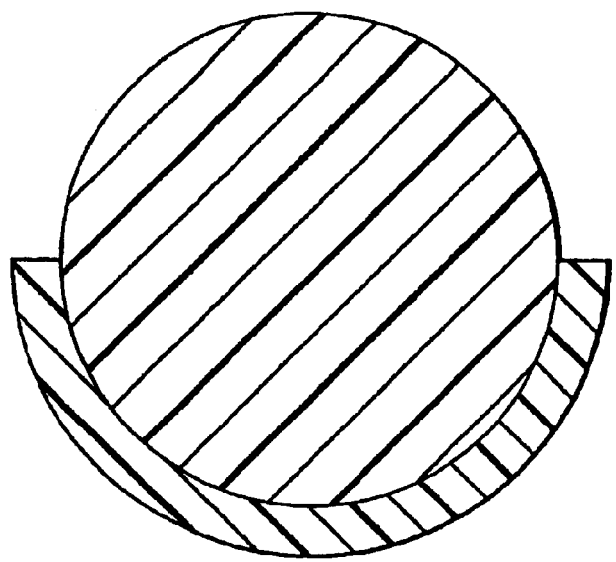
FIG. 4 is a schematic, cross sectional view of a circular wave-guide according to the present invention.

While in a preferred embodiment of the invention light guide 230 shown in FIG. 2 is formed from a light fiber (see, for example, FIG. 4), it should be recognized that the present invention is not limited to light fibers but rather is applicable to any form of light guide. Moreover, the light guides need not have a circular cross-section, but rather may have any desired shape. For example, in some embodiments the present invention contemplates the use of planar waveguides.

The present invention encompasses light guides having optical quality light extraction structures which are configured and distributed along the light guide. In particular, the size and spacing of the light extraction structures need not be uniform. For example, in some embodiments of the invention it may be advantageous to increase the density of light extraction structures at locations increasingly distant along the longitudinal axis of the light guide. Such an arrangement can improve the uniformity in the brightness of the light emitted along the longitudinal axis because the greatest amount of light in the light fiber is available for extraction immediately adjacent to the light source. Diminishing amounts of light are available further down the core because light has already been extracted. By increasing the density of light extraction structures (i.e., the total surface area of the light extraction structures per unit surface area of fiber) at increasing distances from the light source, the least amount of light extraction takes place closest to the light source and the greatest amount takes place farthest away from the source.

A reflector 243 may be incorporated at the end of light guide 230 that is remote from the light source. Any light that is not emitted by one of the light extraction structures $218_1$, $218_2$, $218_3$, . . . upon its initial pass through the light guide will be reflected so that it has another opportunity to be emitted by a light extraction structure. In this way a greater portion of the total light directed into light guide 230 is used for illumination purposes. Instead of reflector 243, light sources may be provided at both ends of the light guide. In this case the density of light extraction structures is preferably greatest at the middle of the light guide and decreases toward both light guide ends, assuming both light sources are equal in intensity.

Figure 5:
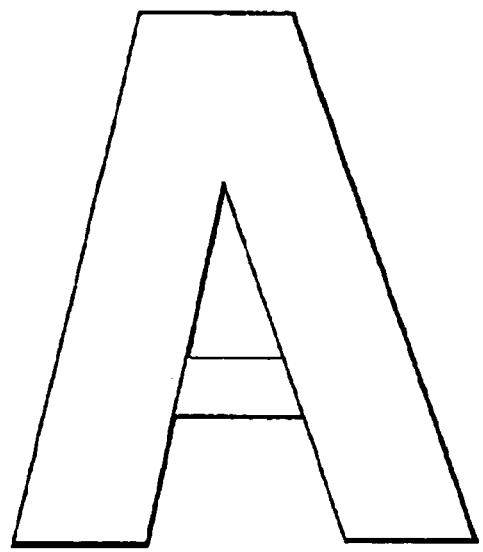
FIG. 5 is a schematic view of a waveguide resembling a letter according to one aspect of the invention.

It should be noted that the illumination device of the present invention is not limited to a light guide that extends linearly. More generally, the light guide may have any shape that is desired for a given application. For example, if the illumination device is to be used in place of neon lighting, the light guide may be constructed to at least partially resemble a letter, numeral, or other symbol (see, for example, FIG. 5).

Light Guide Illumination Device Fabrication

The illumination device of the present invention may be fabricated by any desired technique. In one method the light extraction structures are directly micro-machined into the light guide itself. In another method, a molding process is employed, which uses a conventional mold such as a two piece mold. Alternatively, the mold may be an expandable mold of the type disclosed in U.S. application Ser. No. 09/026,836, entitled "Method and Apparatus for Seamless Microreplication Using an Expandable Mold." Briefly, an expandable mold is formed from a flexible material having a generally hollow portion that corresponds to the shape of the desired finished article (i.e., the light guide). The hollow portion is accessible through at least one opening. The hollow portion is filled with a curable material that hardens in the shape of the hollow portion of the mold. Once hardened, the finished article is removed by applying a pressure differential between the inside and outside of the mold so that the walls of the mold distend to facilitate removal of the molded article. Additional details concerning the expandable mold may be found in the previously mentioned patent application, which is hereby incorporated by reference in its entirety including the drawings, as if repeated herein.

Regardless of the type of mold that is employed, the curable material that forms the finished article may be any material that hardens into a substantially optically transparent material and which can be introduced into the mold and hardened at temperatures and/or pressure conditions that do adversely affect the mold. The curable material may be curable by heat, radiation, or other known processes. Suitable curable materials include a polymerizable compound or mixture. Acrylates are a class of curable materials that are preferable for their transparency properties. Urethanes are also a desirable class of curable materials because their contraction during curing tends to be minimal, although only certain formulations have desirable transparency properties. Yet another curable material that may be used is silicone.

Other techniques also may be used in the fabrication of the illumination device of the present invention. For example, U.S. Pat. No. 5,631,994 is directed to a method in which an overlay is provided that incorporates the extraction structures. The overlay, which is formed from an optically transparent substrate, is fabricated by conventional manufacturing processes, such as a molding process. An adhesive backing is applied to the overlay so that it can adhere to the fiber core.

The diffuse reflective layer may be formed on the light guide by any of a variety of means including direct contact and an index matching optical adhesive. Alternatively, the reflective layer can be directly coated onto the light guide in a manner similar to paint. The reflective layer can be provided on the light guide core or cladding, if present.

What is claimed is:

1. An illumination device comprising:
  a light guide including a light guide core having an optically smooth surface for propagating light therethrough and a light emitting region extending along a portion of the core wherein said light guide is a light fiber, the light emitting region including:
  at least one light extraction structure located along the optically smooth surface of the light guide core, said light extraction structure including an optically reflective surface extending into the light guide core and oriented to reflect light at an angle less than a critical angle necessary for light to propagate through the light guide core; and
  a diffuse reflective material disposed around at least a portion of the light guide to direct at least a portion of the light reflected by the light extraction structure back through the light guide core so that light is emitted through the light emitting region of the optically smooth surface.

2. The device of claim 1 wherein said light guide has a circular cross-sectional shape.

3. The device of claim 1 further comprising a plurality of light extraction structures distributed along the optically smooth surface of the light guide core.

4. The device of claim 3 wherein the plurality of light extraction structures are equally spaced apart from one another along the optically smooth surface.

5. The device of claim 3 wherein the plurality of light extraction structures are unequally spaced apart from one another along the optically smooth surface.

6. The device of claim 1 wherein said light guide is formed from a polymerizable material.

7. The device of claim 6 wherein said polymerizable material is an acrylate material.

8. The device of claim 7 wherein said polymerizable material is a urethane material.

9. The device of claim 1 further comprising a cladding material surrounding the light guide core.

10. The device of claim 9 wherein the diffuse reflective sheet material is disposed around a portion of the cladding.

11. The device of claim 1 wherein the diffuse reflective sheet material comprises a polymeric material.

12. The device of claim 1 wherein the diffuse reflective sheet material comprises a microvoided material.

13. The device of claim 1 wherein the diffuse reflective sheet material is a material formed by thermally induced phase separation.

14. The device of claim 1 wherein the diffuse reflective material comprises a microporous material.

15. The device of claim 14 wherein the microporous material comprises polytetrafluoroethylene.

16. An illumination device comprising:
a light guide including a light guide core having an optically smooth surface for propagating light therethrough, a cladding surrounding said core, and a light emitting region extending along a portion of the core, the light emitting region including:
at least one light extraction structure located along the optically smooth surface of the light guide core, said light extraction structure including an optically reflective surface extending into the light guide core and oriented to reflect light at an angle less than a critical angle necessary for light to propagate through the light guide core; and
a diffuse reflective material disposed around at least a portion of the light guide to direct at least a portion of the light reflected by the light extraction structure back through the light guide core so that light is emitted through the light emitting region of the optically smooth surface.

17. The device of claim 16 wherein said light guide is a light fiber.

18. The device of claim 16 wherein said light guide has a circular cross-sectional shape.

19. The device of claim 16 wherein said light guide is a planar light guide.

20. The device of claim 16 further comprising a plurality of light extraction structures distributed along the optically smooth surface of the light guide core.

21. The device of claim 20 wherein the plurality of light extraction structures are equally spaced apart from one another along the optically smooth surface.

22. The device of claim 20 wherein the plurality of light extraction structures are unequally spaced apart from one another along the optically smooth surface.

23. The device of claim 16 wherein said light guide is formed from a polymerizable material.

24. The device of claim 23 wherein said polymerizable material is an acrylate material.

25. The device of claim 24 wherein said polymerizable material is a urethane material.

26. The device of claim 16 wherein the diffuse reflective sheet material is disposed around a portion of the cladding.

27. The device of claim 16 wherein the diffuse reflective sheet material comprises a polymeric material.

28. The device of claim 16 wherein the diffuse reflective sheet material comprises a microvoided material.

29. The device of claim 16 wherein the diffuse reflective sheet material is a material formed by thermally induced phase separation.

30. The device of claim 16 wherein the diffuse reflective material comprises a microporous material.

31. The device of claim 30 wherein the microporous material comprises polytetrafluoroethylene.

* * * * *